US008531812B2

(12) United States Patent
Barenthin et al.

(10) Patent No.: US 8,531,812 B2

(45) Date of Patent: Sep. 10, 2013

(54) SURGE ARRESTER WITH A VARISTOR ELEMENT AND METHOD FOR PRODUCING A SURGE ARRESTER

(75) Inventors: Gundolf Barenthin, Berlin (DE); Erhard Pippert, Dallgow-Döberritz Ot Seer (DE); Dirk Springborn, Berlin (DE); Markus Sulitze, Falkensee (DE)

(73) Assignee: Siemens Aktiengesellschaft, Munich (DE)

( * ) Notice: Subject to any disclaimer, the term of this patent is extended or adjusted under 35 U.S.C. 154(b) by 94 days.

(21) Appl. No.: 13/128,674

(22) PCT Filed: Nov. 2, 2009

(86) PCT No.: PCT/EP2009/064458
§ 371 (c)(1),
(2), (4) Date: May 11, 2011

(87) PCT Pub. No.: WO2010/054947
PCT Pub. Date: May 20, 2010

(65) Prior Publication Data
US 2011/0216464 A1 Sep. 8, 2011

(30) Foreign Application Priority Data
Nov. 11, 2008 (DE) ........................ 10 2008 057 232

(51) Int. Cl.
*H02H 1/00* (2006.01)

(52) U.S. Cl.
USPC .......................................... 361/127; 361/117

(58) Field of Classification Search
USPC ........................................ 361/117–120, 127
See application file for complete search history.

(56) References Cited

U.S. PATENT DOCUMENTS

| | | | | |
|---|---|---|---|---|
| 4,812,944 | A | 3/1989 | Eberhard et al. | |
| 5,608,597 | A | 3/1997 | Holmstrom et al. | |
| 5,818,677 | A * | 10/1998 | Bennett et al. ................ | 361/127 |
| 5,912,611 | A | 6/1999 | Berggren et al. | |
| 7,154,728 | B2 | 12/2006 | Schmidt et al. | |
| 2005/0105238 | A1 | 5/2005 | Schmidt et al. | |
| 2008/0088406 | A1 * | 4/2008 | Klaube et al. .................. | 338/21 |

FOREIGN PATENT DOCUMENTS

| | | | |
|---|---|---|---|
| DE | 3406691 | A1 | 9/1985 |
| DE | 29905311 | U1 | 6/1999 |
| EP | 0 683 496 | A1 | 11/1995 |
| EP | 1 447 822 | A1 | 8/2004 |
| WO | 96/07186 | A1 | 3/1996 |
| WO | 0055869 | A1 | 9/2000 |

OTHER PUBLICATIONS

International Search Report of PCT/EP2009/064458 Dated Feb. 10, 2010.

* cited by examiner

*Primary Examiner* — Danny Nguyen
(74) *Attorney, Agent, or Firm* — Laurence A. Greenberg; Werner H. Stemer; Ralph E. Locher

(57) ABSTRACT

A surge arrester has a varistor element. A first and a second armature body are pressed against the varistor element by way of a bracing device. At least one of the armature bodies has a shoulder on which a cross-member of the bracing device is supported. A tensioning leg is fitted to the cross-member.

8 Claims, 2 Drawing Sheets

SURGE ARRESTER WITH A VARISTOR ELEMENT AND METHOD FOR PRODUCING A SURGE ARRESTER

BACKGROUND OF THE INVENTION

Field of the Invention

The invention relates to a surge arrester with a varistor element, against which a first and a second mounting body are pressed at opposing ends by means of a clamping device.

A surge arrester of this kind is disclosed, for example, in the U.S. Pat. No. 4,812,944. The surge arrester here is bounded on opposing ends of its varistor element by mounting bodies. A clamping device is provided for clamping the mounting bodies against the varistor element. For example, it is proposed that hooks, in which fibers or strips can be suspended, are formed on the mounting bodies. In order to achieve a clamping between the mounting bodies, it is further proposed that the fibers or strips are shrunk, for example by the effect of heat radiation.

Suspending the fibers/strips in the hooks requires a multiplicity of operations during a production process. Furthermore, the position of the fibers/strips in the hooks and of the mounting bodies on the varistor element must be safeguarded in a suitable manner until the surge arrester is clamped. Assembly of the surge arrester is laborious due to the complex design thereof.

BRIEF SUMMARY OF THE INVENTION

The object of the invention is therefore to specify a surge arrester which has a simpler design and is therefore more cost-effective to produce.

According to the invention, this is achieved with a surge arrester of the kind mentioned in the introduction in that at least one of the mounting bodies has a shoulder on which a cross member of the clamping device is supported and at least one tensioning leg is fitted to the cross member.

By using a cross member on the clamping device and supporting the cross member on a shoulder of the mounting body, inherently angularly rigid elements are used to transmit compression forces between the clamping device and the mounting bodies. It is therefore possible, for example, to place the cross member on the shoulder under pre-tension. This results in a self-locking structure which provides a clamping effect immediately after the cross member has been placed on the shoulder. After fitting the clamping device to the mounting body, for example, this makes it possible to transport and further process a surge arrester during production of said surge arrester, free from stabilizing frames or similar.

At the same time, it can advantageously be provided that supporting surfaces which face one another and are complimentary in shape are formed on cross member and shoulder.

The cross member rests with a supporting surface on a supporting surface of the shoulder. In doing so, the supporting surfaces should be designed to be complimentary in shape at least in sections so that unintentional slipping or movement of the cross member from the shoulder is prevented. For this purpose, it can be provided, for example, that the supporting surfaces which are complimentary in shape have sections which at least in part have surface sections running in the direction of the compression force to be produced by the clamping device.

Surface sections of this kind can protrude from the supporting surfaces or protrude into them, for example at right angles. Pegs, holes, latching lugs, recesses or similar can be arranged in the supporting surfaces. However, profiles, for example, can also be introduced into supporting surfaces. For example, corrugated profiles, asymmetrical teeth, symmetrical teeth or similar can be used.

An advantageous embodiment can provide that a number of tensioning legs are fitted to a cross member in pairs.

In order to guarantee that the clamping device supports the mounting bodies, it is necessary that at least one tensioning leg transmits tensile forces between mounting bodies or between one or more cross members. When one tensioning leg is used, this can be fitted centrally to the cross member, for example. At the same time, the tensioning leg itself can be designed to be angularly stiff. It can, however, also be provided that the tensioning leg itself is inherently unstable, for example flexibly deformable or elastically extensible. The arrangement of an even number of tensioning legs on a cross member can be advantageous in order to produce a compression force between the mounting bodies which is distributed as uniformly as possible. For example, it can be provided that in each case one or more tensioning legs are positioned on both sides of a supporting surface so that, when a cross member has been placed on a shoulder, tensioning legs which are fitted to the cross member extend perpendicular to a push-on direction of the cross member on both sides of the shoulder. A cross member is an angularly stiff body to which a plurality of tensioning legs, for example, is fitted. The tensioning legs are arranged at a distance from one another. Forces can be transmitted between the tensioning legs or forces can be transmitted to other components via the cross member. A cross member is preferably formed as a transverse beam which provides mechanical stabilization, connection and fixing.

Furthermore, it can advantageously be provided that at least one of the mounting bodies has a plurality of shoulders which are arranged distributed symmetrically on the circumference of the varistor element relative to the clamping direction of the mounting bodies.

A holding force is produced in a clamping direction between the mounting bodies by means of a clamping device. In doing so, the clamping direction preferably passes through the varistor element. Preferably, the individual tensioning legs should be arranged distributed on the outer circumference of the varistor element so that a cage formed by the individual tensioning legs encloses the varistor element on the jacket side. In this way, an additional mechanical protection of the varistor element can be guaranteed after the clamping device has been clamped. If a plurality of shoulders is now arranged distributed symmetrically on the circumference of the mounting body, then, for example, an approximately uniform distribution of tensioning legs is possible with an identical embodiment of a plurality of cross members and a plurality of tensioning legs. A position of the cross members is unambiguously defined by the position of the shoulders. Consequently, a cage structure is formed around the varistor element by the tensioning legs which are fitted to the cross members. A clamping device can have a plurality of independent cross members which are arranged on shoulders of a mounting body.

Furthermore, it can advantageously be provided that the clamping device has two identical cross members which are aligned in opposition to one another.

If the clamping device is fitted with identical cross members which are aligned in opposition to one another, then it is possible to connect the cross members to one another by means of at least one, preferably by means of several tensioning legs, preferably in pairs. For example, it is possible to press mounting bodies which lie at opposing ends of the varistor element against one another with shoulders which are arranged thereon while interposing the varistor element. It is possible to regulate the clamping force which is to be applied by means of the clamping device by the choice of length of the tensioning legs. Depending on the requirement, this enables the mounting bodies to be pressed against the varistor element with a greater or lesser force. As well as a design of a mechanically stiff angularly rigid surge arrester, the application of an increased clamping force can also result in an electrical contact between the mounting bodies and the varistor element. This enables electrical contact to be made with the varistor element via the mounting bodies, and the varistor element to be used to protect against overvoltages in electrical power transmission installations, for example.

Advantageously, in doing so, it can be provided that the first and the second mounting bodies are formed identically.

Using identical mounting bodies enables a mounting position of the surge arrester to be chosen comparatively freely. Furthermore, the number of components to be designed is additionally reduced by the use of identical parts. This enables stockholding to be carried out more cost-effectively, as a result of which the total production costs for a surge arrester are reduced.

A further object of the invention is to specify a method for producing a surge arrester with a first and a second mounting body which are pressed against opposing ends of a varistor element by means of a clamping device.

According to the invention, for a method of the above kind, the object is achieved in that in each case the first and the second mounting bodies are placed at opposing ends of the varistor element and pressed by external forces against the varistor element, that a first and a second cross member are fitted at opposing ends of at least one tensioning leg, that the first cross member is placed on a shoulder of the first mounting body and the second cross member on a shoulder of the second mounting body and the external forces are reduced and the mounting bodies are pressed against the varistor element by means of the tensioning leg which is placed under tension and the cross members of the clamping device.

By placing the mounting bodies on the varistor element and pressing the same against the varistor element by means of an external force, this results in a compression of the assemblies which are to be connected to one another. This compression can vary within a range of a few millimeters, wherein the compression should preferably be reversible. Connecting the two cross members creates a clamping device which can be placed on the shoulders of the two mounting bodies. In doing so, the dimension of the tensioning leg or legs should be chosen in such a way as to enable easy placement of the cross members on the shoulders, even though the tensioning leg or legs are subjected to pre-tensioning during placement. This pre-tensioning prevents unintentional loosening of the fitted cross members on the shoulders against their push-on direction.

When the cross members, which are connected to one another by means of the at least one tensioning leg, have been fitted, the external forces are reduced. Reducing the external forces results in a reversal of the compression of the varistor element and mounting bodies which occurred while the external forces were applied. Removal of the external forces results in an elongation of the stack comprising mounting bodies and varistor element. As a result, the tensioning legs are placed under increased tension. An elongation of the mounting bodies and the varistor element is limited and the stack is pressed together by means of the cross members which are fitted to the mounting bodies.

An angularly rigid stack is now formed which can be dismantled, for example even after the tensioning legs have been clamped, by again applying external forces to the mounting bodies from opposing directions and compressing the stack which comprises mounting bodies and varistor element so that the tensioning legs are relaxed and the cross members can be removed from the shoulders. This enables repairs, for example, to be carried out on surge arresters produced in this way.

In the following, an exemplary embodiment of the invention is shown schematically in a drawing and subsequently described in more detail.

In the drawing:

DESCRIPTION OF THE INVENTION

Figure 1:
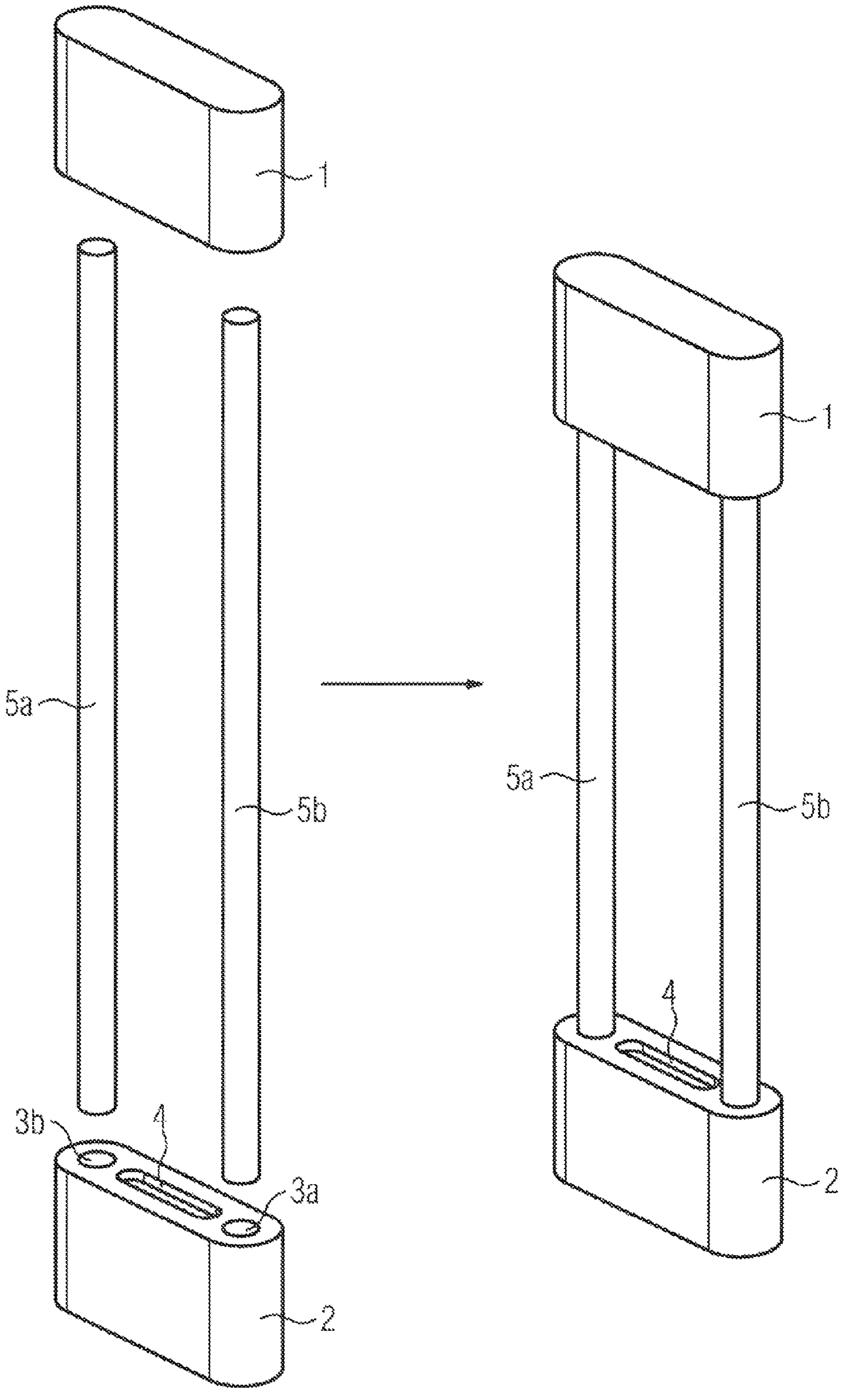
FIG. 1 shows tensioning legs being fitted on two cross members.

An embodiment of a clamping element is shown by way of example in FIG. 1. A clamping device can have one or more clamping elements. At the same time, the clamping element has a first cross member 1 and a second cross member 2. The first and the second cross members 1, 2 are designed as identically shaped bodies. In doing so, the cross members 1, 2 each have a cuboid-shaped basic structure, wherein two opposite ends of the cross members 1, 2 each have chamfered corners, namely in such a way that a section of an outer surface of a circular cylinder is produced. The cross members 1, 2 each have recesses 3*a*, 3*b* in the vicinity of the rounded ends. These recesses 3*a*, 3*b* are formed in the manner of blind holes for example. The recesses 3*a*, 3*b* lie in a supporting surface. The supporting surface is bounded by two body edges of the cross member 1, 2 which lie parallel with one another. The two parallel body edges merge into curved body edges of the rounded ends and connect the two parallel body edges at their respective ends. A depression 4 is formed in the supporting surface. In the present example, the depression 4 is in the form of a slot. The supporting surface of the cross member 1, 2 with the appropriate depression 4 is used for placing on a complimentary shaped supporting surface of a shoulder 9*a*, 9*b*, 9*c*, 9*d*. In particular, the depression 4 prevents a cross member 1, 2 sliding off a shoulder 9*a*, 9*b*, 9*c*, 9*d* in a direction perpendicular to the clamping direction of the clamping device.

Tensioning legs 5*a*, 5*b* are inserted in the recesses 3*a*, 3*b*. In the exemplary embodiment, the tensioning legs 5*a*, 5*b* are designed as dimensionally stable rods. Preferably, the tensioning legs should act in an electrically insulating manner to prevent the formation of a current path between the cross members 1, 2 arranged on the ends of the tensioning legs and aligned in opposing directions. Glass fiber rods have proved to be successful in forming the tensioning legs 5*a*, 5*b*. In addition, other suitable materials can also be used. The tensioning legs 5*a*, 5*b* are inserted into the recesses 3*a*, 3*b* of the cross members 1, 2 and fitted there. The tensioning legs 5*a*, 5*b* can be fitted to the cross members 1, 2 using different methods and devices. For example, it is possible to fit the tensioning legs 5*a*, 5*b* to the cross members 1, 2 by fusion, by force or by interlocking. In this regard, it has been shown to be favorable to clamp or press the tensioning legs 5*a*, 5*b* in the recesses 3*a*, 3*b*.

When the tensioning legs 5*a*, 5*b* have been fitted to the first and the second cross members 1, 2, a clamping element is formed which is able to transmit forces between the cross members 1, 2 via the tensioning legs 5*a*, 5*b*.

Figure 2:
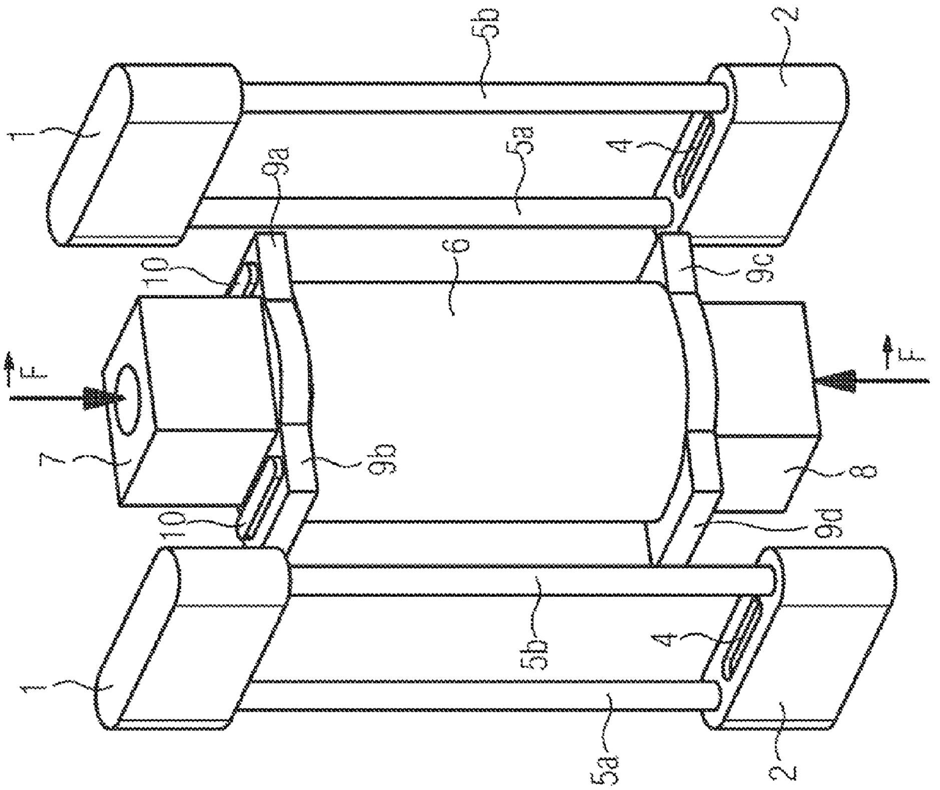
FIG. 2 shows a stack of mounting bodies and a varistor element during the fitting of cross members on the shoulders of the mounting bodies.

A stage during the production of a surge arrester is shown in FIG. 2. The surge arrester has a varistor element 6. The varistor element 6 is a sintered metal oxide body, for example, which if necessary has a multiplicity of sub-sections stacked on top of one another. A first mounting body 7 and a second mounting body 8 are arranged on the ends of the varistor element 6. The mounting bodies 7, 8 are designed to be electrically conducting so that electrical contact with the varistor element 6 can be made via the mounting bodies 7, 8. In this way, it is possible, for example, to connect the varistor element 6 between a live phase conductor and earth potential in order to protect an electrical device. Different shapes can be provided for the mounting bodies 7, 8 depending on the requirement. In the present example, the two mounting bodies 7, 8 are designed identically, wherein they are placed on the varistor element 6 aligned in opposing directions at opposing ends of the varistor element 6. For this purpose, the varistor element 6 preferably has circular face surfaces. Contact surfaces of the mounting bodies 7, 8 are fitted to the circular face surfaces. Contact blocks are provided on the sides which face away from the contact surfaces of the mounting bodies 7, 8. Cable lugs, for example, can be screwed to the contact blocks to effect an electrical contact with the surge arrester. It can also be provided that appropriate threaded rods or other suitable elements are screwed into or formed on the contact blocks.

With regard to their pressing direction against the varistor element 6, the two mounting bodies 7, 8 have radially protruding shoulders 9*a*, 9*b*, 9*c*, 9*d* on their circumference. These shoulders 9*a*, 9*b*, 9*c*, 9*d* are provided with a supporting surface. In the supporting surfaces, elevations 10 which are identical but opposite to the depressions 4 are arranged in the supporting surfaces of the cross members 1, 2. The supporting surfaces of the cross members 1, 2 are therefore at least in sections identical but opposite to the supporting surfaces of the shoulders 9*a*, 9*b*, 9*c*, 9*d*.

The stack comprising first mounting body 7, varistor element 6 and second mounting body 8 is pressed together and compressed by means of external forces F. At least one clamping element, but advantageously a plurality of clamping elements, can now be placed on the shoulders 9*a*, 9*b*, 9*c*, 9*d*. In doing so, the distance between shoulders 9*a*, 9*b*, 9*c*, 9*d*, which are arranged flush with one another on the first mounting body 7 and the second mounting body 8, is chosen in such a way that the clamping device with first cross member 1 and second cross member 2, which are connected to one another by means of the fitted tensioning legs 5*a*, 5*b*, can be pushed onto the elevations 10 on the shoulders 9*a*, 9*b*, 9*c*, 9*d* in a push-on direction so that it latches. The identical but opposite depression 4 in the supporting surfaces of the cross members 1, 2 keeps the cross members 1, 2 in position on the shoulders 9*a*, 9*b*, 9*c*, 9*d*. In the present example, two clamping elements which have identical cross members 1, 2 and tensioning elements 5*a*, 5*b* are provided and form a clamping device. The number of clamping elements can be increased if required. It is therefore possible, for example, to arrange three or four clamping elements symmetrically distributed around the varistor element 6. A corresponding number of shoulders must be provided on the two mounting bodies 7, 8 for this purpose.

When the clamping elements have been latched onto the shoulders 9*a*, 9*b*, 9*c*, 9*d*, the external forces F are reduced. As a result, the compression of the mounting bodies 7, 8 and the varistor element 6 which has been generated reverses so that the mounting bodies 7, 8 and the varistor element 6 expand in the clamping direction of the clamping device. The clamping elements of the clamping device are thereby placed under increased tension. However, the clamping device is sized so that the expanding stack comprising mounting bodies 7, 8 and varistor element 6 cannot expand completely to its original size.

This results in adequate clamping of the mounting bodies 7, 8 to the varistor element 6. It can also be provided that the tensioning legs 5*a*, 5*b* are elongated while the mounting bodies 7, 8 and the varistor element 6 are relieved of the external forces F, so that an additional compression force can be exerted by the tensioning legs 5*a*, 5*b*.

The surge arrester is stably clamped by means of the cross members 1, 2 and the shoulders 9*a*, 9*b*, 9*c*, 9*d* on the first and the second mounting bodies 7, 8.

Figure 3:
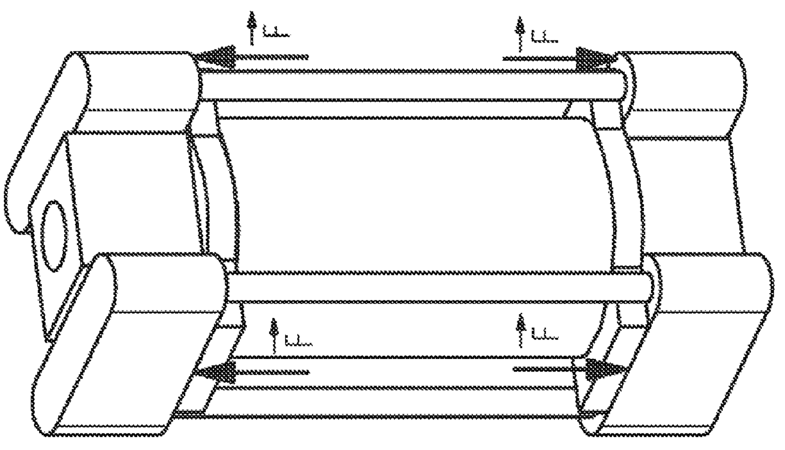
FIG. 3 shows a clamped surge arrester.

As shown in FIG. 3, at the same time it is provided that the rounded ends of the cross members 1, 2 have a dielectric screening effect on the contact blocks of the first and the second mounting bodies 7, 8.

The surge arrester so formed can be enclosed in a housing for its protection. In doing so, it is possible, for example, to use electrically insulating sleeves or to provide a plastic encapsulation on the surge arrester.

The invention claimed is:

1. A surge arrester, comprising:

a varistor element having opposing ends;

first and second mounting bodies and a clamping device pressing said first and second mounting bodies at said opposing ends of said varistor element;

said clamping device having a cross-member and at least one tensioning leg fitted to said cross-member; and at least one of said first and second mounting bodies having a shoulder on which said cross member of said clamping device is supported, said cross member and said shoulder being formed with supporting surfaces facing one another and having complimentary shape.

2. The surge arrester according to claim 1, wherein said at least one tensioning leg is one of a plurality of tensioning legs fitted in pairs to a respective said cross member.

3. The surge arrester according to claim 1, wherein at least one of said mounting bodies is formed with a plurality of shoulders disposed in symmetrical distribution on a circumference of said varistor element, relative to a clamping direction of said mounting bodies.

4. The surge arrester according to claim 1, wherein said clamping device has two substantially identical cross members aligned in opposition to one another.

5. The surge arrester according to claim 1, wherein said first and second mounting bodies are formed identically.

6. A method for producing a surge arrester, the method which comprises:

providing a varistor element, first and second mounting bodies, and a clamping device;

placing the first and second mounting bodies at mutually opposite ends of the varistor element and pressing the mounting bodies by external forces against the varistor element;

fitting first and second cross members at mutually opposite ends of at least one tensioning leg;

placing the first cross member on a shoulder of the first mounting body and placing the second cross member on a shoulder of the second mounting body; and reducing the external forces and pressing the mounting bodies against the varistor element by way of the cross members of the clamping device and the tensioning leg that is being subjected to tension.

7. A surge arrester, comprising:

a varistor element having opposing ends;

first and second mounting bodies and a clamping device pressing said first and second mounting bodies at said opposing ends of said varistor element;

said clamping device having a cross-member and a plurality of tensioning legs; and at least one of said first and second mounting bodies having a shoulder on which said cross member of said clamping device is supported;

wherein said tensioning legs are fitted in pairs to a respective said cross-member.

8. A surge arrester, comprising:

a varistor element having opposing ends;

first and second mounting bodies and a clamping device pressing said first and second mounting bodies at said opposing ends of said varistor element;

said clamping device having a cross-member and at least one tensioning leg fitted to said cross-member; and at least one of said first and second mounting bodies having a shoulder on which said cross member of said clamping device is supported;

wherein at least one of said mounting bodies is formed with a plurality of shoulders disposed in symmetrical distribution on a circumference of said varistor element, relative to a clamping direction of said mounting bodies.

* * * * *